United States Patent [19]

Van Dijk et al.

[11] Patent Number: 4,818,210
[45] Date of Patent: Apr. 4, 1989

[54] APPARATUS FOR COMPRESSING A STACK OF JUXTAPOSED FOILS

[75] Inventors: Cornelis D. Van Dijk, Veldhoven; Johannes Brandsma; Willem R. De Wild, both of Eindhoven, all of Netherlands

[73] Assignee: U.S. Philips Corporation, New York, N.Y.

[21] Appl. No.: 210,069

[22] Filed: Jun. 15, 1988

Related U.S. Application Data

[63] Continuation of Ser. No. 14,514, Feb. 3, 1987, abandoned.

[30] Foreign Application Priority Data

Feb. 25, 1986 [NL] Netherlands .......................... 8600462

[51] Int. Cl.$^4$ ............................................. A01J 21/00
[52] U.S. Cl. ................................ 425/411; 100/258 R; 72/465
[58] Field of Search .................. 425/78, 150, 141, 406, 425/411, 457; 100/258 R; 72/465

[56] References Cited

U.S. PATENT DOCUMENTS

| | | | |
|---|---|---|---|
| 2,636,433 | 4/1953 | Wennberg | 100/258 R |
| 3,034,425 | 5/1962 | Huetter | 100/258 R |
| 4,557,792 | 12/1985 | Yamada et al. | 100/258 R |
| 4,612,689 | 9/1986 | De Wild et al. | 72/465 |

FOREIGN PATENT DOCUMENTS

| | | | |
|---|---|---|---|
| 133629 | 8/1902 | Fed. Rep. of Germany | 425/406 |
| 804066 | 2/1981 | U.S.S.R. | 72/465 |

Primary Examiner—Bernard Nozick
Attorney, Agent, or Firm—Norman N. Spain

[57] ABSTRACT

A sintering press for comprising a stack of foils is formed of a lower die, an upper die opposing the lower die and a furnance surrounding the dies. At least one of the two dies is supported at its end face remote from the other die by a spherical bearing surface so that this die can adjust itself by tilting so that the center lines of the two dies are no longer in line with each other. As a result, a uniform pressure distribution is obtained on the stack of foils.

6 Claims, 1 Drawing Sheet

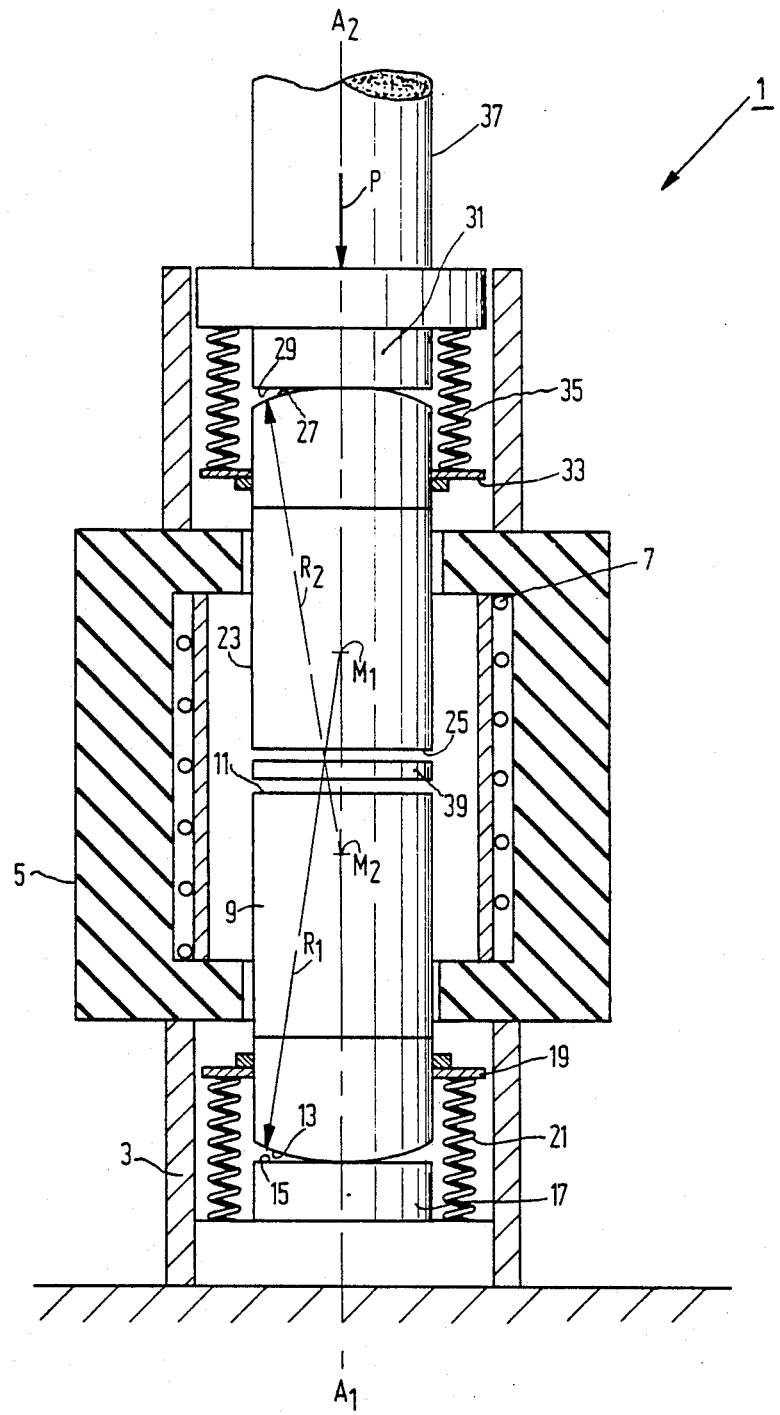

APPARATUS FOR COMPRESSING A STACK OF JUXTAPOSED FOILS

This is a continuation of application Ser. No. 014,514, filed Feb. 13, 1987, now abandoned.

BACKGROUND OF THE INVENTION

The invention relates to an apparatus for compressing a stack of juxtaposed foils containing an oxidic ceramic powder that may be mixed with an organic binder and layers with patterns of electrically conducting material interposed between the foils, this apparatus comprising a furnace and two dies each die having a pressure face and an end face remote from the pressure surface opposing and extending through boundary walls of the furnace into the interior of the furnace, the pressure face of one die opposing the pressure surface of the other die, in such a manner that the stack can be arranged between the opposing pressure faces of the dies within the furnace, while at least one of the dies has connected to it means by which the dies can be pressed towards each other.

Such an apparatus intended to be used in the manufacture of multilayer capacitors is known from European Patent Application No. 0,137,566. In this known apparatus, one die is fixedly arranged, while the other die, arranged in line with the one die, is displaceable solely in the direction of the coinciding center lines of the two dies by means of a displacement cylinder. This apparatus in itself has proved to be satisfactory, but has the disadvantage in that deviations in the shaping of the stack of foils may result in deviations in the pressure forces exerted on the foils over the area of the pressure surfaces.

SUMMARY OF THE INVENTION

In order to overcome this disadvantage, according to the invention at least one of the dies is supported at its end face remote from the other die with respect to the remaining part of the apparatus by a spherical bearing surface extending transversely to the center line of the relevant die.

With the use of such a construction, the die can adjust itself under the influence of the forces exerted on the die during compression of the stack automatically to such a position that a pressure force uniformly distributed over the pressure surface is exerted on the stack by the die.

Furthermore, the apparatus also offers the possibility of compressing a wedge-shaped stack between the two dies.

BRIEF DESCRIPTION OF THE DRAWING

The sole FIGURE of the drawing is a diagrammatic view of an apparatus of the invention.

DETAILED DESCRIPTION OF THE INVENTION

The invention will be described more fully hereinafter with reference to an embodiment of the apparatus according to the invention shown diagrammatically in the accompanying FIGURE.

The apparatus 1 shown in the FIGURE comprises a furnace 5, which is supported by columns 3 or the like and is provided with heating members indicated diagrammatically by reference numeral 7, for example a heater coil. This furnace may be, for example, of the type as indicated in the aforementioned European Patent Application No. 0,137,566.

A vertically arranged die 9 extends through a lower wall of the furnace and is limited at its upper end by a pressure face 11 extending at right angles to the centre line $A_1$ of the die. At the end face remote from the pressure face, the die 9 is bound by a spherical bearing surface 13, by which the die bears on the straight supporting surface 15 of a counter-block 17. The center $M_1$ of the radius of curvature $R_1$ of the bearing surface 13 is located in the embodiment shown on the center line $A_1$ of the die 9, i.e. at a certain distance from the pressure face 11 on the side remote from the bearing surface 13.

The end of the die 9 projecting below the furnace 5 has secured to it a connection member 19, which may be constituted, for example, by a ring extending around the die and secured to the die or by a number of radially extending arms arranged at regular angular distances from each other and secured to the die. A number of springs, in the embodiment helical springs 21, are arranged between the connection member 19 and the counterblock 17 at regular angular distances from each other.

A second die 23 extends through an opening provided in the upper wall of the furnace 5 and is normally arranged in line with the die 9 and essentially has the same shape. Thus, the die 23 is provided with a pressure face 25, which is located opposite to the pressure face 11 of the die 9 and extends at right angles to the center line $A_2$ of the die 23. At its other end, the die 23 is provided with a spherical bearing surface 27, by which the die bears on the straight supporting surface 29 of a pressure block 31.

The center $M_2$ of the radius of curvature $R_2$ of the bearing surface 27 is located on the centre line $A_2$ of the die 23, i.e. at a certain distance from the pressure surface 25 on the side remote from the bearing surface 27.

The end of the die 23 projecting above the furance 5 has secured to it a connection member 33 corresponding to the connection member 19. Helical springs 35 corresponding to the springs 21 are arranged between this connection member 33 and the pressure block 31.

With suitable means, such as, for example, a hydraulic press 37 shown diagrammatically, a force can be exerted on the pressure block 31 in the direction indicated by the arrow P in order to press the die 23 towards the die 9. A product arranged between the pressure surfaces 11 and 25 of the two dies 9 and 23, such as a stack of foils and interposed layers described above, can be compressed whilst simultaneously heating the assembly by means of the heating members 7 of the furnace 5.

In the FIGURE, the dies 9 and 23 are shown in a neutral position, in which their centre lines $A_1$ and $A_2$ are in line with each other.

If the force exerted during operation on the pressure surfaces 11 and 25, respectively, of a die 9 or 23 is not uniformly distributed over these pressure surfaces the relevant die can adjust itself by tilting on the spherical bearing surface 13 or 27, as a result of which the dies reach relative positions in which their centre lines are no longer in line with each other. On the one hand, it is guaranteed that with products, whose boundary surfaces touching the pressure faces 11 and 25 of the dies are at least substantially parallel to each other, a uniform pressure is exerted on the whole surface. On the other hand, the possibility is obtained of arranging between the dies also more or less wedge-shaped products while guaranteeing a uniform compression of the material.

The force required to obtain a tilting of a die on the relevant spherical bearing surface can be influenced by the choice of the strength of the springs 21 and 35, respectively, which will permit a tilting of a die only if the forces exerted by these springs on the die are overcome, and which will always tend to hold the die in the neutral position shown in the FIGURE or to force it back into this position.

As further appears from the FIGURE, the center $M_1$ or $M_2$ of the radius of curvature $R_1$ or $R_2$ of the spherical bearing surface 13 or 27 of the die 9 or 23 is located on the side of the pressure surfaces 11 or 25 remote from this bearing surface, i.e. on the center line $A_1$ or $A_2$ of the relevant die. Due to this construction, an undesired bending-out of the dies is counteracted when these dies are subjected to pressure.

Of course, variations and/or additions of the apparatus according to the invention described above and shown in the FIGURE are possible within the spirit and scope of the invention.

For example, it will be conceivable to form also the end faces of the dies 9 and 23 so that they are straight and extend at right angles to the centre lines of the dies, in which event the supporting surfaces of the counter-block 17 and of the pressure block 31, respectively, cooperating with these end faces may have a convex shape.

In the embodiment shown, the resilient means are in the form of helical springs. However, leaf springs or rod-shaped springs may also be employed.

What is claimed is:

1. In an apparatus for compressing a stack of juxtaposed foils containing an oxidic ceramic powder that may be mixed with an organic binder and layers, provided with patterns of electrical conducting material, interposed between said foils, said apparatus comprising a furnace and two dies, supported in opposed relationship to each other, each die having a pressure face and an end face remote from said pressure face, said pressure faces opposing each other, supporting means for supporting said dies, at said end faces, in a direction opposed to each other along an axis extending along the centers of each said dies and intersecting said faces, at least one of said supporting means being capable of pressing the pressure face of the die supported thereby toward the opposing pressure face of the opposing die in a direction along an axis joining said end faces and means connected to said dies for maintaining said dies in a direction opposed to each other along said axis, and said dies extending through boundary walls of said furnace in a manner such that the opposing pressure faces are positioned within the furnace and that said stack can be arranged between said pressure faces, the improvement wherein a spherical bearing surface contacting a planar bearing surface is provided between one of said supporting means and the end face of said die supported by said supporting means, said spherical bearing surface extends in a direction transverse to said axis and at least one of said end faces has a spherical bearing surface.

2. An apparatus as claimed in claim 1, wherein the end faces of both the dies have spherical bearing surfaces.

3. An apparatus as claimed in claim 1 wherein an end face, of one of said dies having a spherical bearing surface, has a shape such that the center of the radius of curvature of said spherical bearing surface is located on the center line of said die on the side of said spherical bering surface facing said other die.

4. The apparatus of claim 3 wherein said center of the radius of curvature is located on the center line of said die on the side of said spherical bearing surface away said die and at a distance from the pressure face of said die.

5. The apparatus of claim 1 wherein one of said dies is supported by resilient means positioned to counteract any movement of said die from the position in which the center line of said die is in line with the center line of said other die.

6. The apparatus of claim 5 wherein the resilient means are constituted by a number of springs in tension arranged around the perimeter of said die at regular angular distance from each other and connecting said die to the supporting means supporting the end face of said die.

* * * * *